(12) United States Patent
Yasui et al.

(10) Patent No.: US 12,042,952 B2
(45) Date of Patent: Jul. 23, 2024

(54) METHOD OF PRODUCING CERAMIC MANUFACTURED OBJECT

(71) Applicant: CANON KABUSHIKI KAISHA

(72) Inventors: Nobuhiro Yasui, Yokohama (JP); Kanako Oshima, Tokyo (JP); Hisato Yabuta, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 16/855,922

(22) Filed: Apr. 22, 2020

(65) Prior Publication Data
US 2020/0247005 A1    Aug. 6, 2020

Related U.S. Application Data

(63) Continuation of application No. PCT/JP2018/039993, filed on Oct. 26, 2018.

(30) Foreign Application Priority Data

Oct. 27, 2017 (JP) ................................. 2017-208190
Oct. 24, 2018 (JP) ................................. 2018-200029

(51) Int. Cl.
*B28B 1/00* (2006.01)
*B33Y 10/00* (2015.01)
(Continued)

(52) U.S. Cl.
CPC ............. *B28B 1/001* (2013.01); *B33Y 10/00* (2014.12); *B33Y 70/10* (2020.01); *B33Y 80/00* (2014.12);
(Continued)

(58) Field of Classification Search
CPC ......... B28B 1/001; B33Y 10/00; B33Y 70/10; B33Y 80/00; B33Y 30/00; B33Y 50/02; B29C 64/153; B29C 64/268; B29C 64/393
See application file for complete search history.

(56) References Cited

U.S. PATENT DOCUMENTS

2002/0195746 A1* 12/2002 Hull ...................... B29C 64/124
                                                                425/375
2013/0064706 A1    3/2013 Schwarze et al.
(Continued)

FOREIGN PATENT DOCUMENTS

CN          1828838 A      9/2006
CN        101932429 A     12/2010
(Continued)

OTHER PUBLICATIONS

Additional Manufacturing of Ceramics: Some Pioneer Studies and Future Prospects; Function & Materials, vol. 34, No. 9, Sep. 2014, pp. 12-17.
(Continued)

*Primary Examiner* — Seyed Masoud Malekzadeh
*Assistant Examiner* — Xinwen Ye
(74) *Attorney, Agent, or Firm* — Canon U.S.A., Inc. I.P. Division

(57) ABSTRACT

A method of producing a ceramic manufactured object including (i) a step of leveling a ceramic powder to form a powder layer, (ii) a step of irradiating the powder layer with a laser beam based on three-dimensional data to crystallize an irradiated site, and (iii) performing the steps (i) and (ii) in repetition, wherein in the step (ii), a surface of the powder layer is irradiated with the laser beam in an unfocused state.

15 Claims, 5 Drawing Sheets

(51) Int. Cl.
*B33Y 70/10* (2020.01)
*B33Y 80/00* (2015.01)
*C04B 35/117* (2006.01)
*C04B 35/64* (2006.01)

(52) U.S. Cl.
CPC ............ *C04B 35/117* (2013.01); *C04B 35/64* (2013.01); *C04B 2235/3217* (2013.01); *C04B 2235/3224* (2013.01); *C04B 2235/6026* (2013.01); *C04B 2235/665* (2013.01)

(56) References Cited

U.S. PATENT DOCUMENTS

| | | | |
|---|---|---|---|
| 2014/0377321 | A1 | 12/2014 | Nimal |
| 2015/0004042 | A1 | 1/2015 | Nimal |
| 2015/0251247 | A1* | 9/2015 | Monsheimer ........... B29C 64/40 219/76.11 |
| 2017/0045877 | A1 | 2/2017 | Shapiro et al. |
| 2018/0186082 | A1* | 7/2018 | Randhawa .............. B22F 12/44 |
| 2018/0281284 | A1* | 10/2018 | Elgar .................... B29C 64/371 |

FOREIGN PATENT DOCUMENTS

| | | |
|---|---|---|
| CN | 102432302 A | 5/2012 |
| CN | 103193486 A | 7/2013 |
| CN | 104831276 A | 8/2015 |
| CN | 104903028 A | 9/2015 |
| CN | 105026076 A | 11/2015 |
| CN | 105163922 A | 12/2015 |
| CN | 105764675 A | 7/2016 |
| CN | 106862562 A | 6/2017 |
| CN | 106994515 A | 8/2017 |
| DE | 102008021507 A1 | 11/2009 |
| DE | 102008021507 A1 * | 11/2009 ........... C04B 35/109 |
| EP | 1772210 A2 | 4/2007 |
| EP | 2292357 A1 | 3/2011 |
| EP | 2276711 B1 * | 9/2014 ......... C04B 35/4885 |
| JP | 2620353 B2 | 6/1997 |
| JP | 2010-114472 A | 5/2010 |
| JP | 4655063 B2 | 3/2011 |
| JP | 2016-007836 A | 1/2016 |
| JP | 2016-504215 A | 2/2016 |
| JP | 2016-516888 A | 6/2016 |
| JP | 2016-540109 A | 12/2016 |
| JP | 2017-082321 A | 5/2017 |
| JP | 2017-127999 A | 7/2017 |
| WO | WO88/02677 A2 | 4/1988 |
| WO | WO-2012102655 A1 * | 8/2012 ........... B29C 64/393 |

OTHER PUBLICATIONS

Hagedorn, Yves-Christian et al., "Net Shaped High Performance Oxide Ceramic Parts by Selective Laser Melting", Physics Procedia 5 (2010) 587-594.

* cited by examiner

METHOD OF PRODUCING CERAMIC MANUFACTURED OBJECT

CROSS-REFERENCE TO RELATED APPLICATIONS

This application is a Continuation of International Patent Application No. PCT/JP2018/039993, filed Oct. 26, 2018, which claims the benefit of Japanese Patent Application No. 2017-208190, filed Oct. 27, 2017 and Japanese Patent Application No. 2018-200029, filed Oct. 24, 2018, all of which are hereby incorporated by reference herein in their entirety.

BACKGROUND OF THE INVENTION

Field of the Invention

The present invention relates to a method of producing a ceramic manufactured object, in particular, a direct-manufacturing-system production method using a laser light.

Description of the Related Art

For producing a trial product in a short time or producing a small number of parts, a method of producing a desired manufactured object by bonding material powders through an energy beam, in particular, a direct-manufacturing-system method of producing a three-dimensional manufactured object has been spreading in recent years. Particularly in a metal field, a manufactured object which is dense and rich in variety has been produced using a powder bed fusion method (power bed fusion). High denseness of a metal manufactured object is achieved by effectively fusing and solidifying metal powders. Based on the success in the metal field, development of it in ceramic materials has been discussed and many efforts thereon have been reported. Common ceramic materials such as aluminum oxide and zirconium oxide hardly absorb a light of an Nd:YAG laser or a Yb fiber laser which is an energy beam ordinarily used for the powder bed fusion method. In order to fuse them, more energy should be charged than in the case of metals. Diffusion of a laser light, however, disturbs uniform fusion, making it difficult to attain necessary manufacturing accuracy. Further, ceramic materials having a high melting point are rapidly cooled by the atmosphere or peripheral portion adjacent thereto when fused through a laser light and then solidified. Function & Materials, 34, September issue (2014) 12-17 discloses that a manufactured object obtained becomes amorphous.

Physics Procedia 5 (2010) 587-594, on the other hand, discloses a technology of lowering the melting point by using a ceramic having an $Al_2O_3$—$ZrO_2$ eutectic composition and thereby reducing energy necessary for fusion. Physics Procedia 5 (2010) 587-594 also discloses a technology of irradiating a manufacturing region with a laser light for manufacturing while heating (preliminary heating) it with an auxiliary laser light to a temperature not exceeding both 1600° C. and the melting point and thereby obtaining a crystalline manufactured object while preventing the relax of a thermal stress or rapid cooling and suppressing crack formation. Due to sintering of the ceramic material powders in the preliminarily heated region by the auxiliary laser light, however, it was difficult to achieve shape accuracy at the surface boundary portion of the structural body.

The present invention provides a production method for obtaining a crystalline ceramic manufactured object having good shape accuracy without preliminary heating. Particularly, in a powder bed fusion method, it provides a production method for obtaining a crystalline-rich manufactured object by avoiding ceramic powders fused by a laser light from becoming amorphous when solidified.

SUMMARY OF THE INVENTION

In one aspect of the present invention, there is provided a method of producing a ceramic manufactured object, including repeatedly performing:
(i) a step of leveling ceramic powders to form a powder layer; and
(ii) a step of irradiating the powder layer with a laser beam based on three-dimensional data through a laser focusing optical system and thereby crystallizing an irradiated site, wherein in the step (ii), a surface of the powder layer is irradiated with the laser beam in an unfocused state.

Further features of the present invention will become apparent from the following description of exemplary embodiments with reference to the attached drawings.

DESCRIPTION OF THE EMBODIMENTS

Figure 1A:
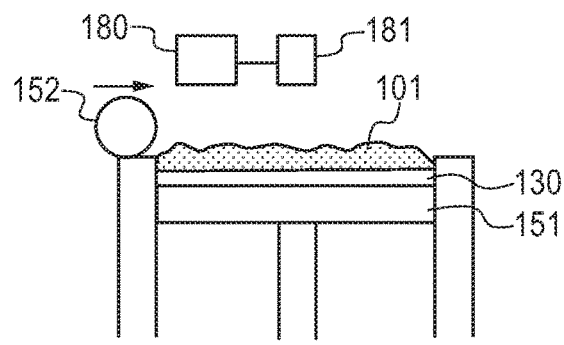
FIG. 1A is a cross-sectional view schematically showing one embodiment of the method of producing a manufactured object according to the present invention.

The embodiment of the present invention will hereinafter be described referring to the drawings, but the present invention is not limited at all by the following specific examples.

The present invention is effective in a direct manufacturing system, a so-called powder bed fusion method and the fundamental manufacturing flow thereof will be described using FIGS. 1A to 1H.

Figure 1E:
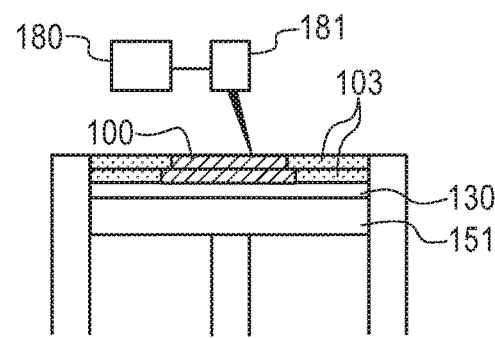
FIG. 1E is a still further cross-sectional view schematically showing the one embodiment of the method of producing a manufactured object according to the present invention.
Figure 1B:
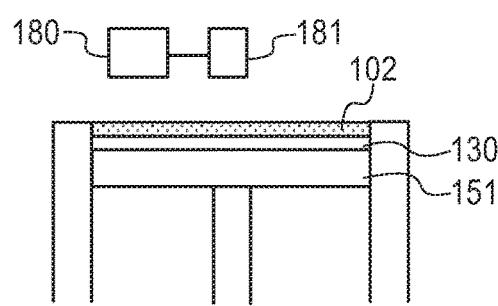
FIG. 1B is another cross-sectional view schematically showing the one embodiment of the method of producing a manufactured object according to the present invention.
Figure 1F:
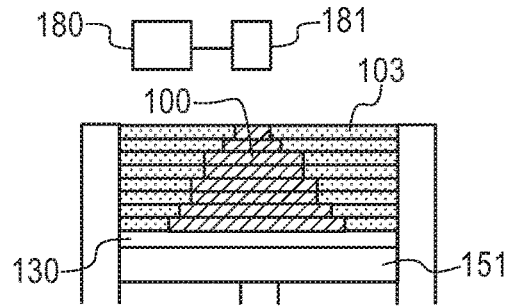
FIG. 1F is a still further cross-sectional view schematically showing the one embodiment of the method of producing a manufactured object according to the present invention.
Figure 1C:
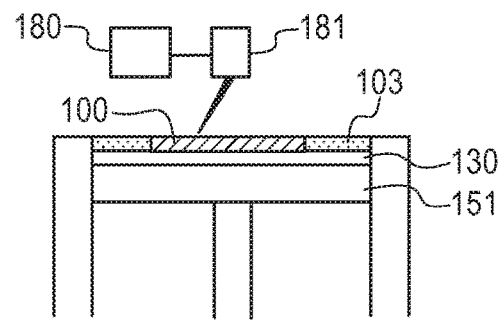
FIG. 1C is a further cross-sectional view schematically showing the one embodiment of the method of producing a manufactured object according to the present invention.
Figure 1G:
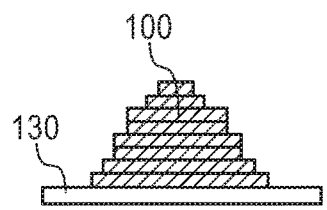
FIG. 1G is a still further cross-sectional view schematically showing the one embodiment of the method of producing a manufactured object according to the present invention.
Figure 1D:
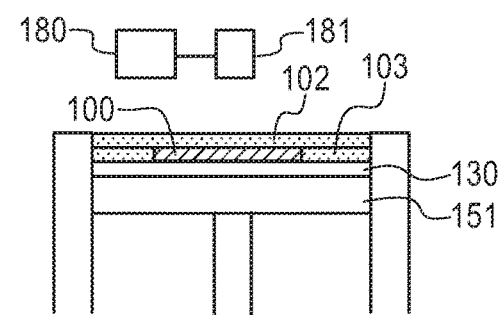
FIG. 1D is a still further cross-sectional view schematically showing the one embodiment of the method of producing a manufactured object according to the present invention.
Figure 1H:
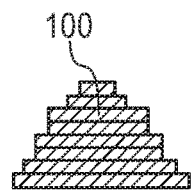
FIG. 1H is a still further cross-sectional view schematically showing the one embodiment of the method of producing a manufactured object according to the present invention.

First, a powder 101 is placed on a base table 130 and the powder 101 is levelled using a roller 152 to form a powder layer 102 (FIG. 1A and FIG. 1B). Next, based on 3D data of a three-dimensional model which is to be manufactured, a surface of the powder layer 102 is irradiated with a laser beam jetted from a laser beam source 180 including a laser focusing optical system, while being scanned with a scanner portion 181. The powder is fused during irradiation with the laser beam and after the laser beam passes thereover, the fused portion is solidified into a manufactured object 100 (FIG. 1C). Next, after the stage 151 is lowered, a new powder layer 102 is formed on the resulting manufactured object 100 and is irradiated with a laser beam based on the 3D data while being scanned (FIG. 1D and FIG. 1E). A series of the above-described steps is performed in repetition to form a manufactured object 100 having a desired shape (FIG. 1F). Lastly, the powders 103 which have remained unsolidified are removed (FIG. 1G) and if necessary, removal of an unnecessary portion from the manufactured object 100 or separation of the base table 130 from the manufactured object 100 is performed (FIG. 1H).

In one aspect of the present invention, there is provided a method of producing a ceramic manufactured object including repeatedly performing (i) a step of leveling a ceramic powder to form a powder layer and (ii) irradiating the powder layer with a laser beam based on three-dimensional data to crystallize an irradiated site, in which in the step (ii), a surface of the powder layer is irradiated with the laser beam in an unfocused state.

Each of the steps of the production method of the present invention will hereinafter be described.
<Step (i)>
The method of producing a manufactured object according to the present invention has (i) a step of leveling a ceramic powder to form a powder layer.
The ceramic powder preferably includes a metal oxide as a main component. A manufactured object obtained using a metal oxide as a main component of a raw material of the manufactured object can have good accuracy without any manufacturing failures which will otherwise occur due to decomposition and gasification by irradiation with a laser beam.
The main component of a metal constituting the metal oxide is preferably aluminum. This means that a metal oxide including aluminum oxide or the like as a main component can be used. Aluminum oxide is a general-purpose ceramics for structure and appropriate fusion and solidification of it enables formation of a manufactured object having high mechanical strength.

The powder to be used in the present invention more preferably contain, as a subsidiary component, at least one selected from gadolinium oxide, terbium oxide, and praseodymium oxide. When the powder contains gadolinium oxide, the powder has, in the vicinity of an $Al_2O_3$—$Gd_2O_3$ eutectic composition, a melting point lower than that of aluminum oxide alone. This enables fusion of the powder with less energy and suppresses diffusion of a laser light in the powder, leading to improvement in manufacturing accuracy. In addition, when the powder contains gadolinium oxide, the resulting manufactured object has a phase separated structure composed of two or more phases. As a result, growth of a crack can be suppressed and the resulting manufactured object has improved mechanical strength. Use of an oxide of another rare earth element (except terbium, praseodymium, and the like) instead of gadolinium oxide can also have an effect similar to that of gadolinium oxide. In addition, a powder having sufficient absorption capability of a laser light can have improved manufacturing accuracy because spread of heat within the powder is suppressed, fusion and solidification occur only locally, and an influence of heat to a non-manufactured portion decreases. For example, when an Nd:YAG laser is used, it is more preferred to contain terbium oxide ($Tb_4O_7$) or praseodymium oxide ($Pr_6O_{11}$) as a subsidiary component because they show good absorption of a laser light. As the laser beam of the present invention, not a carbon dioxide laser requiring maintenance but an Nd:YAG laser or Yb fiber laser not requiring maintenance and having output stability is preferred. In addition, a laser having a wavelength near 1 μm is preferred.

From the above-described standpoints, examples of the more preferable powders include $Al_2O_3$—$Gd_2O_3$, $Al_2O_3$—$Tb_4O_7$, $Al_2O_3$—$Gd_2O_3$—$Tb_4O_7$, $Al_2O_3$—$Pr_6O_{11}$, and $Al_2O_3$—$Gd_2O_3$—$Pr_6O_{11}$.

For the base table 130 to be used in the present invention, a material selected as needed from those ordinarily used in the production of a three-dimensional manufactured object, such as ceramics, metals, and glasses in consideration of the intended use or production conditions of the manufactured object can be used.

The powder to be used in the present invention is preferably free of a carbon-containing material such as a resin binder. In addition, the powder has preferably a weight loss of 2% or less when deprived of water thereof and heated up to 400° C., more preferably a weight loss of 2% or less when heated up to 800° C.

A method of disposing the powder 101 on the base table 130 is not particularly limited. In the powder bed fusion method, as shown in FIG. 1A and FIG. 1B, the powder 101 is disposed in a layer form on the base table 130 by a roller 152, a blade, or the like. It is preferred to use a powder with good fluidity in order to level the powder layer 102 more flatly and the powder is preferably rich in spherical ones having a size of 5 μm or more. In order to effectively obtaining a manufactured object by a laser beam, the powder layer 102 has preferably a layer thickness of 5 μm or more to 100 μm or less.
<Step (ii)>
The method of producing a manufactured object according to the present invention has a step of irradiating the powder layer 102 formed in the above step (i) with a focused laser beam based on the three-dimensional data of a three-dimensional model which is an object to be manufactured and crystallizing an irradiated site. The present step will hereinafter be described based on a preferred embodiment.

In the powder bed fusion method, as shown in FIG. 1A to FIG. 1C, a predetermined region of the surface of the powder layer 102 disposed on the base table 130 in the step (i) is irradiated with a laser beam to fuse and then solidify the powder. When the powder is irradiated with a laser beam, the laser light absorbed in the powder is converted into heat and the powder is fused. After completion of the irradiation with the laser beam, the powder thus fused is cooled and solidified as a result of heat release from the atmosphere and the periphery adjacent to the powder and one cross-section of a manufactured object is formed. As described in NPLs 1 and 2, there is a problem that without preliminary heating, rapid cooling occurs in the procedure of fusion and solidification and a manufactured object composed of an amorphous substance is inevitably formed.

Figure 3A:
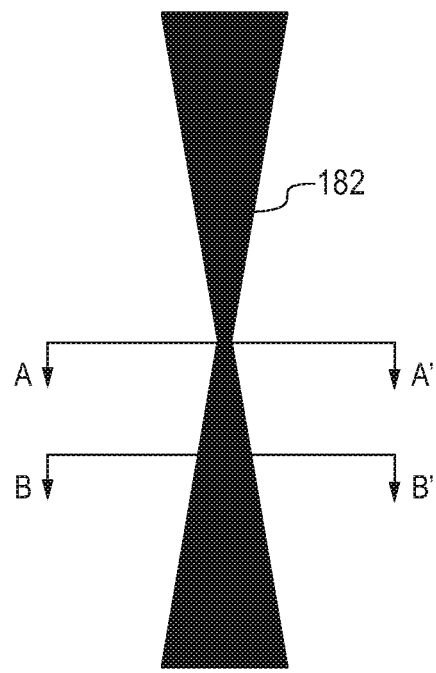
FIG. 3A is a schematic view describing the cross-sectional shape of the laser beam in the present invention.

In the present step, however, crystallization can be performed without high-temperature preliminary heating. In particular, a fused portion can be crystallized by irradiating the surface of the powder layer 102 with a laser beam in an unfocused state. Each of a focused state and an unfocused state will next be described referring to the schematic views of FIG. 3A and FIG. 3B. Since the laser beam source 180 includes an optical system (including a fiber, a laser focusing lens, and the like), the laser beam is designed to reach the powder layer while keeping a high energy density at the center portion of the beam. The term "focused state" means a state in which the laser beam is focused on the surface of the powder layer, while the term "unfocused state" means a state in which the laser beam is not focused on the surface. Although it is possible to say instead that the term "unfocused state" means that the surface of the powder layer is positioned outside the focal depth of the laser beam, the term is not always limited to this meaning. Details will be described later, but the essence of the present invention is to shift the focal position relative to the powder layer in order to obtain a desired intensity profile of the laser beam on the powder layer. The term "unfocused state" as used herein also may mean that for achieving the object of the present invention, the surface of the powder layer is simply shifted from the focal position specified from the focal distance of the laser focusing optical system of an apparatus used.

Figure 3B:
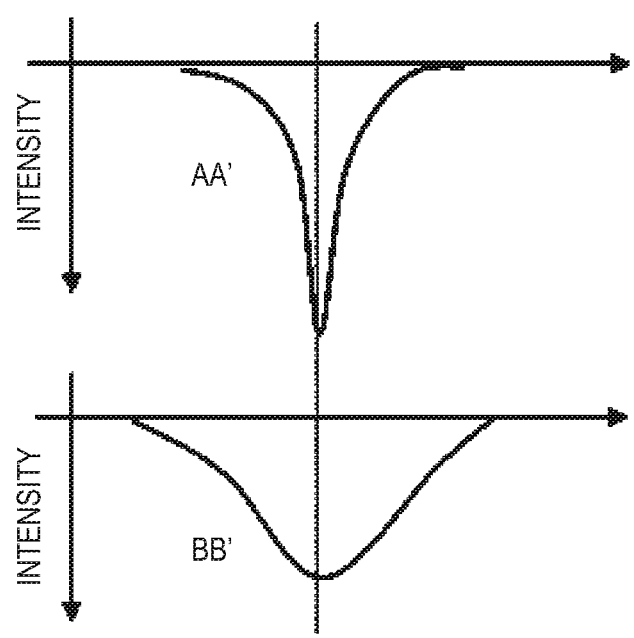
FIG. 3B is another schematic view describing the cross-sectional shape of the laser beam in the present invention.

The intensity distribution of the laser beam 182 at the focused position (in the vicinity of the A-A' cross-section in FIG. 3A) shows a steep Gaussian distribution as shown in the upper graph of FIG. 3B. The intensity distribution of the laser beam 182 at the unfocused position (in the vicinity of the B-B' cross-section in FIG. 3A), on the other hand, shows an intensity distribution relatively milder than that at the focused position as shown in the lower graph of FIG. 3B.

When the powder layer is irradiated with the laser beam in an unfocused state, a temperature gradient at the heated portion is relaxed to prevent rapid cooling from occurring after laser irradiation, which is different from the case in a focused state. This makes it possible to suppress formation of an amorphous substance attributable to rapid cooling and as a result, a ceramic manufactured object having a high crystalline content can be obtained.

Figure 2A:
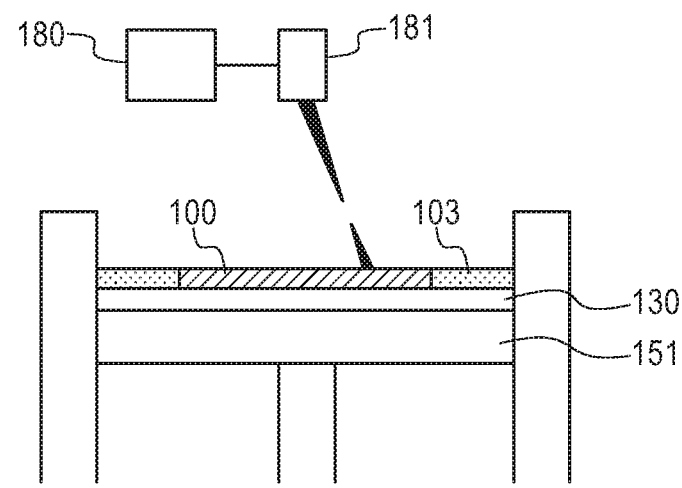
FIG. 2A is a cross-sectional view showing a concept of an unfocused state of the method of producing a manufactured object according to the present invention.
Figure 2B:
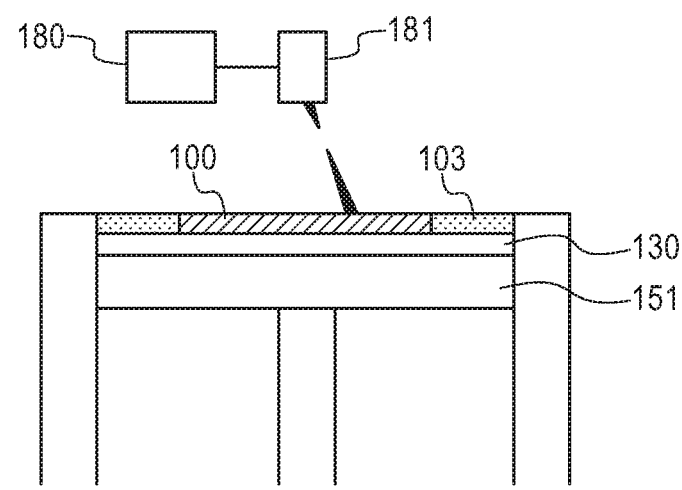
FIG. 2B is a cross-sectional view showing another concept of the unfocused state of the method of producing a manufactured object according to the present invention.

Next, a method of performing laser beam irradiation in an unfocused state will be described. For example, in an apparatus in which a focused state of a laser-focusing optical system is set on the surface of the powder layer 102 of FIG. 1B, an unfocused state can be achieved by, after forming the powder layer 102 in the step (i), moving the stage 151 by a desired height in an upward or downward direction (for example, FIG. 2A). It is also possible to achieve an unfocused state not by adjusting the height of the stage 151 but by moving the lens of a laser-focusing optical system included in the laser beam source 180 or by inserting or detaching the lens into or from an optical path. A desired intensity distribution can also be attained by shaping of the cross-sectional shape of the laser beam (FIG. 2B).

In order to more specifically define the unfocused state in the present invention, it will be defined by a ratio D/L wherein (L) represents the width of fusion at the fused and solidified portion formed by one-line scan irradiation of the powder layer with the laser beam and (D) represents the depth of the fusion. It is to be noted that this irradiation is performed at a laser power and a scanning rate equal to those at the time of manufacturing.

The D/L is preferably 1.0 or less, more preferably $0.2 \leq D/L \leq 0.7$. The D/L of 1.0 or less can suppress formation of an amorphous substance attributable to rapid cooling at the time of solidification.

The D/L can be adjusted by the power or scanning rate of the laser beam in an unfocused state.

In forming a manufactured object by irradiation with a laser beam according to the present invention, the irradiation with the laser beam is performed by line scanning and a plurality of lines adjacent to each other for scanning constitutes a plane. It is preferred that the thickness of the powder layer is 5 μm or more to 100 μm or less and that in order to satisfy required manufacturing accuracy, an average distance between two adjacent lines is 20 μm or more to 400 μm or less, more preferably 50 μm or more to 200 μm or less supposing that the line width is about 100 μm. A ratio of a distance between laser beam irradiation lines to a thickness of the powder layer (line-line distance/thickness of powder layer) is suitably from about 4 to 6.

<Repetition of Steps (i) and (ii)>

In the method of producing a manufactured object according to the present invention, the above-described steps (i) and (ii) are performed repeatedly to form a manufactured object.

On the manufactured object obtained in the step (ii), a powder layer is newly disposed by performing the step (i). When the powder thus disposed is irradiated with a laser beam, the powder located at the irradiated portion is fused and then solidified and a new manufactured object integrated with the previously manufactured portion is then formed. By repeating the steps (i) and (ii) alternately, a manufactured object having a desired three-dimensional shape can be obtained.

<Evaluation Method>

It is preferred to observe an actually manufactured object in order to evaluate that an amorphous substance is formed in an area of laser irradiation with a focused state and a crystalline substance is formed in an area of laser irradiation with an unfocused state. In particular, in an EBSD (Electron Back Scatter Diffraction Patterns) method, image capture of an IQ map (Image Quality map) is preferably perform. The IQ map is a two-dimensional image obtained by digitizing the sharpness of a Kikuchi pattern available from a region irradiated with an electron beam. At this time, a signal can be obtained from a crystalline region but no signal can be obtained from an amorphous region and this can be utilized for finding which portion of the manufactured object is amorphous and which portion is crystalline.

Compared with a crystalline substance, an amorphous substance generally tends to have a density lower by about 20% so that it is possible to find a density of the manufactured object relative to the theoretical density of the crystalline state of a material constituting the manufactured object. In this case, verification is preferably made supposing that the porosity of the manufactured object is almost constant.

Embodiment

The method of producing a manufactured object according to the present invention will hereinafter be described in detail by means of Examples, but the present invention is not limited by the following examples at all.

Example 1

The present example relates to evaluation of a manufactured object obtained when a laser beam is focused or un-focused.

<Preparation of Ceramic Powder as One Example of the Present Invention>

α-$Al_2O_3$ powder (average particle diameter: 20 μm), $Gd_2O_3$ powder (average particle diameter: 25 μm), and $Tb_4O_7$ powder (average particle diameter: 3 μm) each having spherical particle shapes were prepared and were weighed to give an $Al_2O_3$:$Gd_2O_3$:$Tb_4O_7$ mass ratio of 2.10:2.00:0.18. The powders thus weighed were mixed for 30 minutes in a dry ball mill to obtain mixed powders (material powders).

In order to investigate the amount of an organic component contained in the resulting mixed powders, the powder was heated for 12 hours in an electric furnace of 400° C. and a weight change before and after heating was measured, resulting in a weight loss of less than 0.5 wt %. On the other hand, the powder was heated for 12 hours in an electric furnace of 800° C. and a weight change before and after heating was measured, resulting in a weight loss of less than 1.0 wt %.

<Manufacturing Step>

For the formation of a manufactured object, Prox DMP 100 (trade name) of 3D SYSTEMS having a 50-W fiber laser (beam diameter: 65 μm) loaded thereon was used.

First, the above-described material powder was formed into a first powder layer having a thickness of 30 μm on a base table made of alumina with a roller (step (i)). Then, manufacture was performed according to a layout in which Comparative Sample 1 was disposed on a portion of the base table and Sample 1 was placed on the same table at a position not overlapping with the comparative sample. In Comparative Sample 1, as the step (ii), a 6×6 mm square region of the powder layer was fused and solidified by irradiating it with a laser beam of 20 W at a focused position (a stage height of −1.5 mm in the apparatus used in the present example) so as to fill it at a pitch of 100 μm at a rate of 100 mm/s. In Sample 1, on the other hand, as the step (ii) of the present invention, a 6×6 mm square region of the powder layer was fused and solidified by irradiating it with a laser beam of 30 W at an unfocused position (a stage height of −5.0 mm in the apparatus used in the present example) so as to fill it at a pitch of 100 μm at a rate of 140 mm/s. A drawing line was adjusted to be parallel to the side of the square. Then, a new powder layer having a thickness of 20 μm was formed using a roller so as to cover the fused and solidified portion. (step (i)). The powder layer rightly above each of the respective square regions of Comparative Sample 1 and Sample 1 was irradiated with a laser so as to be orthogonal to the drawing line of the first layer under the conditions similar to those described above to fuse and then solidify the powders within a 6×6 mm region. The thickness of each of the second or higher powder layers was fixed to 20 μm.

Figure 4:
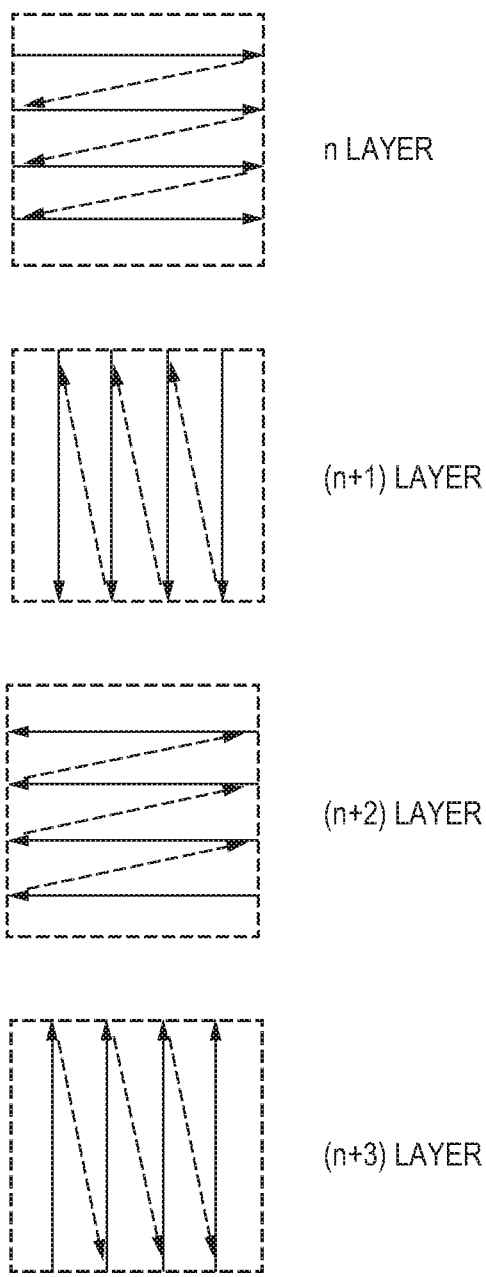
FIG. 4 is a schematic view showing one embodiment of a laser beam irradiation method in the method of producing a manufactured object according to the present invention.

By performing such steps (i) and (ii) in repetition, two manufactured objects having a bottom surface of 6 mm×6 mm and a height of 6 mm were produced. According to a drawing procedure as shown in FIG. 4, drawing was repeated until a manufactured object having a desired thickness was obtained while turning the drawing direction by 90° between any two layers adjacent to each other among an n layer, (n+1) layer, (n+2) layer, and (n+3) layer. In the square region surrounded by a chain line in FIG. 4, a solid line is a line which scans while irradiating with a laser and a broken line is a line which scans without irradiating with a laser.

<Evaluation>

The manufactured objects produced as Comparative Sample 1 and Sample 1, respectively were separated from the alumina of the base table and were cut and polished at a surface vertical to the side surface supposing that the connected portion between the manufactured object and the base table was a bottom surface and thus, they were obtained as observation samples. Observation was made by EBSD and the image capture of an IQ map was performed. The IQ map is a two-dimensional image obtained by digitizing the sharpness of a Kikuchi pattern available from a region irradiated with an electron beam. At this time, a signal can be obtained from a crystalline region but no signal can be obtained from an amorphous region and this can be utilized for finding which portion of the manufactured object is amorphous and which portion is crystalline.

Figure 5A:
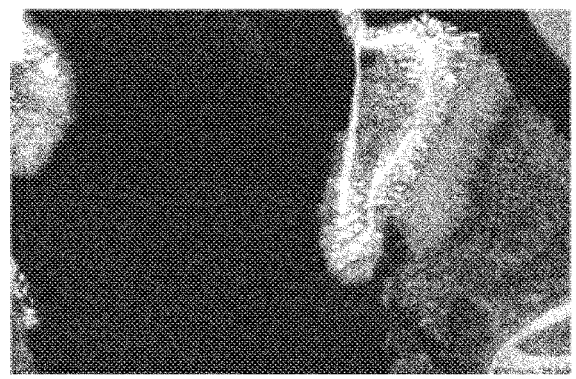
FIG. 5A is an IQ map image of a manufactured object obtained by irradiation with a laser beam in each of a focused state and an unfocused state in an EBSD method.
Figure 5B:
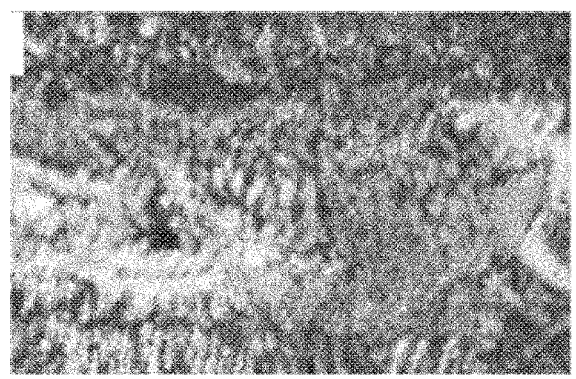
FIG. 5B is another IQ map image of a manufactured object obtained by irradiation with a laser beam in each of a focused state and an unfocused state in an EBSD method.

FIG. 5A is an IQ map of a range including a region of the cross-section of Comparative Sample 1 through which the center portion of the laser beam passes. FIG. 5B is an IQ map of a range including a region of the cross-section of Sample 1 through which the center portion of the laser beam passes.

In the IQ map shown in FIG. 5A, a site corresponding to the center portion of the laser beam is black, showing that the fused and solidified portion is constituted of an amorphous substance. In FIG. 5B, on the other hand, a site corresponding to the center portion of the laser beam is bright, showing that the fused and solidified portion is constituted of a crystalline substance. The fused and solidified portion can be determined to be crystalline without any problem based on the powder constitution used in the present example, though the crystalline portion has a eutectic structure and therefore seems to have a pattern.

Comparative Sample 1 obtained by irradiating the surface of the powder layer with the laser beam at a focused position contained an amorphous region more than a crystalline region. It has been revealed that Sample 1 obtained by irradiating the surface of the powder layer with a laser beam at an unfocused position contained a crystalline region relatively more than an amorphous region. As a result, it has been confirmed that irradiation with a laser beam at an unfocused position is effective for obtaining a crystalline manufactured object.

Example 2

The present example relates to manufacture under conditions changed between a focused state and an unfocused state.

In addition to Comparative Sample 1 and Sample 1, manufactured objects shown in Table 1 were produced according to the manufacturing steps of Example 1. Table 1 shows condition values obtained by changing a laser power successively from 20 W to 30 W and then to 40 W to achieve sufficient fusion of the powder layer even in a focused state or unfocused state and adjusting a scanning rate range to enable manufacturing at a scanning pitch fixed to 100 μm.

Comparative Samples 2 to 5 are those obtained by manufacturing in a focused state (stage height of −1.5 mm in the present example) and Samples 2 to 9 are those obtained by manufacturing in an unfocused state (stage height of −5.0 mm and −7.0 mm in the present example), each an additional sample to Example 1. The manufactured objects of the present example have a theoretical density of 5.72 g/cm³ when they are completely crystalline. A relative density (100×(density of sample)/(theoretical density)) was determined by polishing six faces of each sample manufactured into a 6×6×6 mm size, calculating the density of each sample from the weight and volume thereof, and then dividing it with the theoretical density.

TABLE 1

|  | Stage height [mm] | Laser power [W] | Scanning rate [mm/s] | Scanning pitch [μm] | Relative density [%] |
|---|---|---|---|---|---|
| Comparative Sample 1 | −1.5 | 20 | 100 | 100 | 85.62 |
| Comparative Sample 2 | −1.5 | 20 | 95 | 100 | 83.97 |
| Comparative Sample 3 | −1.5 | 20 | 90 | 100 | 85.20 |
| Comparative Sample 4 | −1.5 | 20 | 85 | 100 | 85.00 |
| Comparative Sample 5 | −1.5 | 20 | 80 | 100 | uncomputable |
| Sample 1 | −5.0 | 30 | 140 | 100 | 93.00 |
| Sample 2 | −5.0 | 30 | 130 | 100 | 93.54 |
| Sample 3 | −5.0 | 30 | 120 | 100 | 95.28 |
| Sample 4 | −5.0 | 30 | 110 | 100 | 96.87 |
| Sample 5 | −7.0 | 40 | 180 | 100 | 92.87 |
| Sample 6 | −7.0 | 40 | 170 | 100 | 94.25 |
| Sample 7 | −7.0 | 40 | 160 | 100 | 95.29 |
| Sample 8 | −7.0 | 40 | 150 | 100 | 96.20 |
| Sample 9 | −7.0 | 40 | 140 | 100 | 98.43 |

Crystallization of the manufactured objects was tried by decreasing the scanning rate of a laser stepwise in the numerical order from Comparative Sample 1 to Comparative Sample 5 to give a higher quantity of heat. The relative density, however, mostly remained unchanged at about 85%. In Comparative Sample 5, the shape of the manufactured object was not retained due to a high quantity of heat so that the relative density was uncomputable. An amorphous substance has a density about 20% lower than that of a crystalline substance. A ratio of the amorphous substance was large so that the relative density mostly remained at about 85%.

Next, crystallization of the manufactured objects was tried by decreasing the scanning rate of a laser stepwise in the numerical order from Sample 1 to Sample 4 to give a higher quantity of heat. It has already been apparent from Example 1 that Sample 1 is constituted of a crystalline substance. Further, an increase in relative density in the numerical order from Sample 2 to Sample 4 is observed, which has revealed an increase in the presence ratio of a crystalline substance. Further, it has been found that in Samples 5 to 9 obtained by adjusting the stage height at −7.0 mm, a similar decrease in laser scanning rate improves a relative density and increases a ratio of a crystalline substance (relative density of 90% or more).

It has therefore been confirmed from the above-described findings that application of a higher quantity of heat does not cause crystallization in a focused state, while application of it tends to cause crystallization in an unfocused state so that manufacturing in an unfocused state is necessary for accelerating crystallization.

Example 3

The present example relates to a mutual relation between the shape of a laser-beam fused portion (which can also be expressed as a "solidified portion") and a focused or an unfocused state. The term "shape of a laser-beam fused portion" as herein employed means a cross-sectional shape of a fused and solidified portion of the powder layer formed by irradiation with a laser beam.

By using powders similar to those used in Example 1, the shape of a fused portion (solidified portion) formed by single irradiation with a laser beam in a focused or unfocused state was measured. More specifically, a powder layer was irradiated with a laser corresponding to one line while scanning. A solidified portion obtained by fusion and solidification of the powder was cut at a plane vertical to the scanning direction of a laser and the shape of it was observed. Only the first one layer (thickness of the powder layer: 30 μm) was manufactured and the shape (D/L) of the laser-beam fused portion was digitized as a ratio of depth D to width L of a portion solidified while biting an alumina plate of a base table.

As to parameters, the stage height was changed from 0.0 to −7.0 mm; the laser power was changed from 20 to 40 W; and the scanning rate was all fixed at 100 mm/s. The results are shown in Table 2.

TABLE 2

| D/L ratio | | Stage height [mm] | | | | | |
|---|---|---|---|---|---|---|---|
|  |  | 0.0 | −1.5 | −3.0 | −4.0 | −5.0 | −6.0 | −7.0 |
| Laser power [W] | 40 | 1.50 | 1.76 | 1.62 | 1.07 | 0.61 | 0.34 | 0.26 |
|  | 35 | 1.38 | 1.70 | 1.46 | 0.91 | 0.46 | 0.28 | 0.20 |
|  | 30 | 1.12 | 1.67 | 1.39 | 0.69 | 0.38 | 0.27 | Uncomputable |
|  | 25 | 0.91 | 1.44 | 0.97 | 0.44 | 0.22 | Uncomputable | Uncomputable |
|  | 20 | 0.85 | 1.29 | 0.66 | 0.30 | 0.16 | Uncomputable | Uncomputable |

From the above results, when the stage height is −1.5 mm, the fused portion (solidified portion) at the time of fusion and solidification has a sharpest cross-sectional shape (maximum D/L value). This position is presumed to be a focused position. Comparative Samples 1 to 5 shown in Examples 1 and 2 can be regarded as a manufactured object obtained by irradiation with a laser beam that actualizes a D/L ratio of 1.29 or a manufactured object under the conditions close thereto. This suggests that an amorphous-rich manufactured object is obtained by irradiation with a laser beam under conditions actualizing a D/L value of 1.29. When the fused portion has such a sharp cross-sectional shape, it is presumed to be amorphous because fusion occurs sharply in the depth direction and heat scatters not only in the downward direction but also in all directions at the solidification time, which accelerates rapid cooling. Therefore, even if the D/L ratio is equal to or more than a value (1.0 or more) in the vicinity of the above-described value, the fused portion is presumed to have a similar state.

It can also be confirmed that a change in beam due to unfocusing is equivalent whether the stage height is on a plus side (higher side) (at the time when the stage height is 0.0 mm) or on a minus side (lower side) (at the time when the stage height is −3.0 mm) from the focused position. Investigation only on a minus side is therefore performed in Examples of the present invention.

It has been confirmed that when the stage height is −5.0 mm in an unfocused state, a D/L ratio is less than 0.7 at any laser power, fusion occurs mildly in the depth direction, and the degree of rapid cooling is relaxed, thus leading to crystallization. In respective regions where the stage height is −6.0 mm and the laser power is from 20 to 25 W and where the stage height is −7.0 mm and the laser power is from 20 to 30 W, fusion has not occurred in the depth direction and the powder was sintered without solidification into a ball or complete fusion. Such a state is found to be unpreferable because it causes a bonding failure with an underlying layer at the time of stacking.

In view of the above-described findings, in order to obtain a crystalline-rich manufactured object, it is preferred to control the laser irradiation conditions (laser power and scanning rate) in the unfocused state of the present invention to give $0.2 \leq D/L \leq 0.7$.

As a supplement, the stage height depends on an apparatus used so that the values of the present examples are intrinsic to the apparatus used for investigation. What is important is to shift a focal position relative to a powder layer, adjust an intensity distribution of a laser beam with which a powder layer is irradiated, and thereby create a state to give a desired D/L ratio. This means that in an apparatus to be used, a shifting degree of a focal position relative to a powder layer changes, depending on the kind of powder used or the specification of the apparatus.

The present invention makes it possible to control a solidification rate of a powder layer from its fusion state so as to obtain a crystalline-rich manufactured object without high-temperature preliminary heating by irradiating, in the powder bed fusion method, a surface of the powder layer with a laser beam in an unfocused state. This makes it possible to provide a manufactured object having mechanical strength higher than an amorphous-rich manufactured object. Further, this makes it possible to control amorphous-to-crystalline shrinkage-induced deformation in heat treatment after the manufacture.

In the present invention, in the direct manufacturing system, a manufactured object having a crystalline substance at a high ratio can be obtained by preventing a metal oxide fused by irradiation with a laser light from becoming amorphous at the time of solidification and therefore a manufactured object which is dense and has less shrinkage at the time of sintering can be produced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of producing a ceramic manufactured object, comprising repeatedly performing:
   (i) a step of leveling a ceramic powder to form a powder layer; and
   (ii) a step of irradiating the powder layer with a scanned laser beam being scanned based on three-dimensional data to melt an irradiated site of the powder layer and then solidifying the irradiated site to form a solidified portion;
   wherein a focal position of the scanned laser beam formed by a laser focusing optical system is shifted from a surface of the powder layer, and the solidified portion includes a crystalline region and an amorphous region smaller than the crystalline region,
   wherein the crystalline region and the amorphous region contains at least one oxide in common,
   wherein in the step (ii), the surface of the powder layer is irradiated with the laser beam so that a ratio D/L falls within a range of $0.2 \leq D/L \leq 0.7$, thereby suppressing formation of an amorphous substance, and
   wherein (L) represents the width of fusion and (D) represents the depth of the fusion at the solidified portion formed by one-line scan irradiation of the power layer with the scanned laser beam.

2. The method of producing a ceramic manufactured object according to claim 1, wherein in the step (ii), preliminary heating is not performed.

3. The method of producing a ceramic manufactured object according to claim 1, wherein in the step (ii), the scanned laser beam has an energy of fusing the powder layer at the irradiated site.

4. The method of producing a ceramic manufactured object according to claim 1, wherein the ceramic powder includes a metal oxide.

5. The method of producing a ceramic manufactured object according to claim 1, wherein the ceramic powder includes aluminum oxide.

6. The method of producing a ceramic manufactured object according to claim 1, wherein a weight loss caused by heating of the ceramic powder to 800° C. is 2% or less.

7. The method of producing a ceramic manufactured object according to claim 1, wherein the scanned laser is a Yb fiber laser, and a laser power of the scanned laser beam is less than 50 W.

8. The method of producing a ceramic manufactured object according to claim 1, wherein the ceramic powder layer has a layer thickness of 5 μm or more to 100 μm or less.

9. The method of producing a ceramic manufactured object according to claim 5, wherein the ceramic powder includes at least one selected from the group consisting of gadolinium oxide, terbium oxide, and praseodymium oxide.

10. The method of producing a ceramic manufactured object according to claim 1, wherein the solidified portion has a relative density of 90% or more, the relative density being defined by (100×(density of the solidified portion)/(density when the solidified portion is completely crystalline)).

11. The method of producing a ceramic manufactured object according to claim 1, wherein the focal position is out of the powder layer.

12. The method of producing a ceramic manufactured object according to claim 1, wherein a distance between the focal position and the surface of the powder layer is 1.5 mm or more.

13. The method of producing a ceramic manufactured object according to claim 12, wherein a distance between the focal position and the surface of the powder layer is 5.5 mm or less.

14. The method of producing a ceramic manufactured object according to claim 1, wherein the scanned laser beam is formed to have a beam diameter of 65 μm.

15. The method of producing a ceramic manufactured object according to claim 1, wherein the laser is a Nd:YAG laser.

* * * * *